US011146757B2

(12) United States Patent
Komori et al.

(10) Patent No.: US 11,146,757 B2
(45) Date of Patent: Oct. 12, 2021

(54) ELECTRONIC APPARATUS AND CONTROL METHOD

(71) Applicant: KABUSHIKI KAISHA TOSHIBA, Minato-ku (JP)

(72) Inventors: Kenji Komori, Yokosuka (JP); Takashi Doi, Fuchu (JP); Nobuaki Suzuki, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/807,291

(22) Filed: Mar. 3, 2020

(65) Prior Publication Data

US 2020/0344445 A1  Oct. 29, 2020

(30) Foreign Application Priority Data

Apr. 23, 2019 (JP) .............................. JP2019-082050

(51) Int. Cl.
*G06F 3/00* (2006.01)
*H04N 7/10* (2006.01)
*H04N 5/38* (2006.01)
*G06F 3/01* (2006.01)
*H04N 7/025* (2006.01)
*H04N 7/08* (2006.01)
*H04N 5/60* (2006.01)

(52) U.S. Cl.
CPC ............... *H04N 7/10* (2013.01); *G06F 3/012* (2013.01); *H04N 5/38* (2013.01); *H04N 5/60* (2013.01); *H04N 7/025* (2013.01); *H04N 7/08* (2013.01)

(58) Field of Classification Search
None
See application file for complete search history.

(56) References Cited

U.S. PATENT DOCUMENTS

| | | | | |
|---|---|---|---|---|
| 2011/0176057 | A1* | 7/2011 | Okamura | H04N 5/44 348/554 |
| 2013/0159565 | A1* | 6/2013 | Soyannwo | G09G 5/006 710/33 |
| 2013/0223456 | A1* | 8/2013 | Kim | H04L 69/324 370/474 |
| 2015/0256786 | A1 | 9/2015 | Katoh et al. | |
| 2016/0261905 | A1 | 9/2016 | Aruga et al. | |

FOREIGN PATENT DOCUMENTS

| | | |
|---|---|---|
| JP | 2014-82754 A | 5/2014 |
| JP | 2015-126304 A | 7/2015 |
| JP | 2015-195573 A | 11/2015 |

* cited by examiner

*Primary Examiner* — Henry Tsai
*Assistant Examiner* — Dean Phan
(74) *Attorney, Agent, or Firm* — Oblon, McClelland, Maier & Neustadt, L.L.P.

(57) ABSTRACT

According to one embodiment, an electronic apparatus includes a receiver and a transmitter. The receiver receives a video signal from an external electronic apparatus through a cable conforming to a High-Definition Multimedia Interface (HDMI) standard. The receiver receives, from the external electronic apparatus through the cable, information for transferring a signal using a function of Audio Return Channel (ARC) or enhanced Audio Return Channel (eARC) of the HDMI standard. The transmitter transmits a position information signal or an audio signal to the external electronic apparatus through the cable, in accordance with the received information.

12 Claims, 7 Drawing Sheets

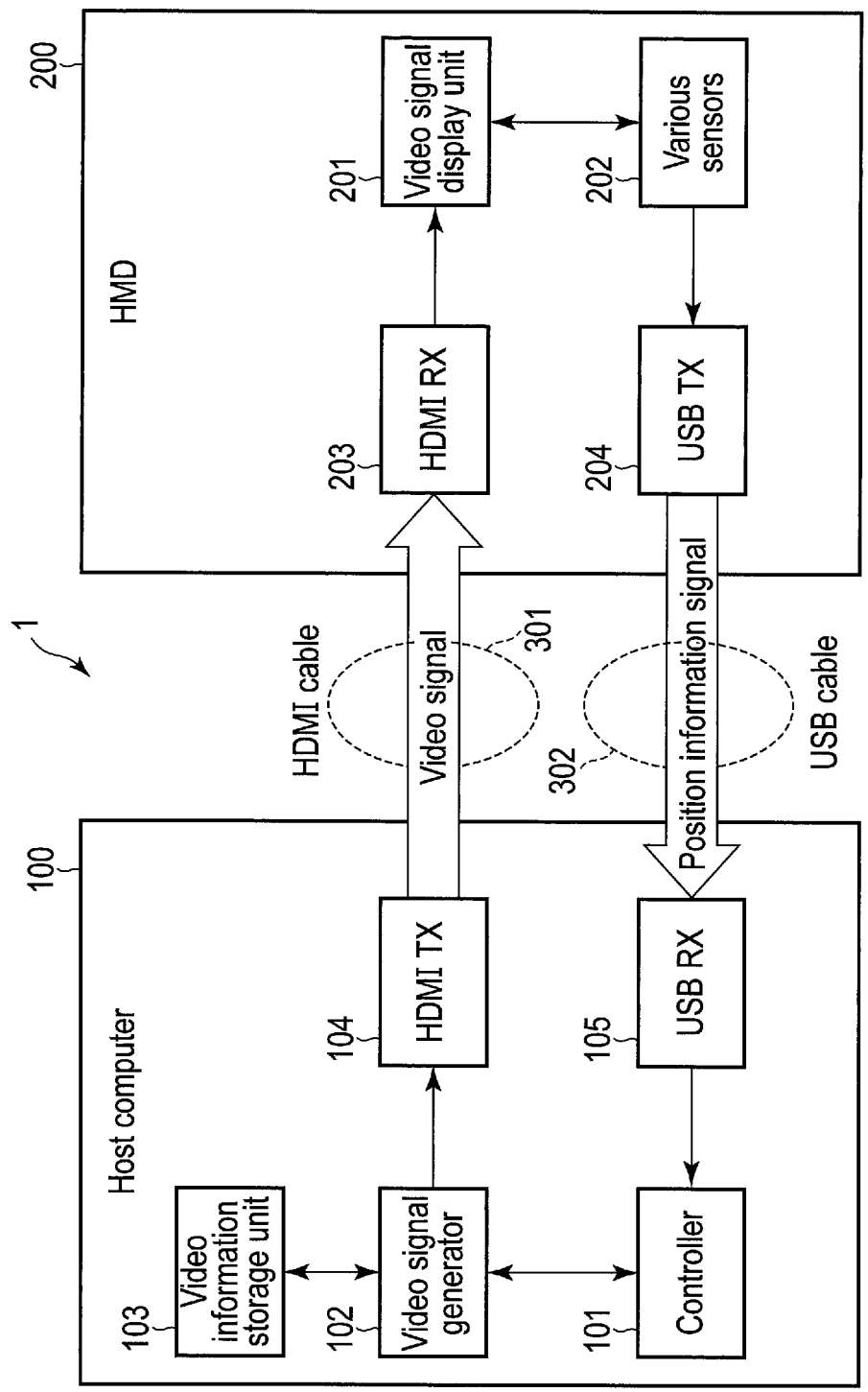
F I G. 1

| | Bit | | | | | | | |
|---|---|---|---|---|---|---|---|---|
| | 7 | 6 | 5 | 4 | 3 | 2 | 1 | 0 |
| EARC_STATE | 0 | 0 | 0 | EARC_MODE | 0 | 0 | 0 | VR_MODE |

| Byte | Bit | | | | | | | |
|---|---|---|---|---|---|---|---|---|
| | 7 | 6 | 5 | 4 | 3 | 2 | 1 | 0 |
| 0 | Stream ID | | | | | | | |
| 1 | Data_Length | | | | | | | |
| 2... (2+Data_Length) | Data_Structure | | | | | | | |

| Value | Description |
|---|---|
| 0 | Audio Stream 1 |
| 1 | Audio Stream 2 |
| 2 | VR Stream 1 |
| 3-255 | Reserved |

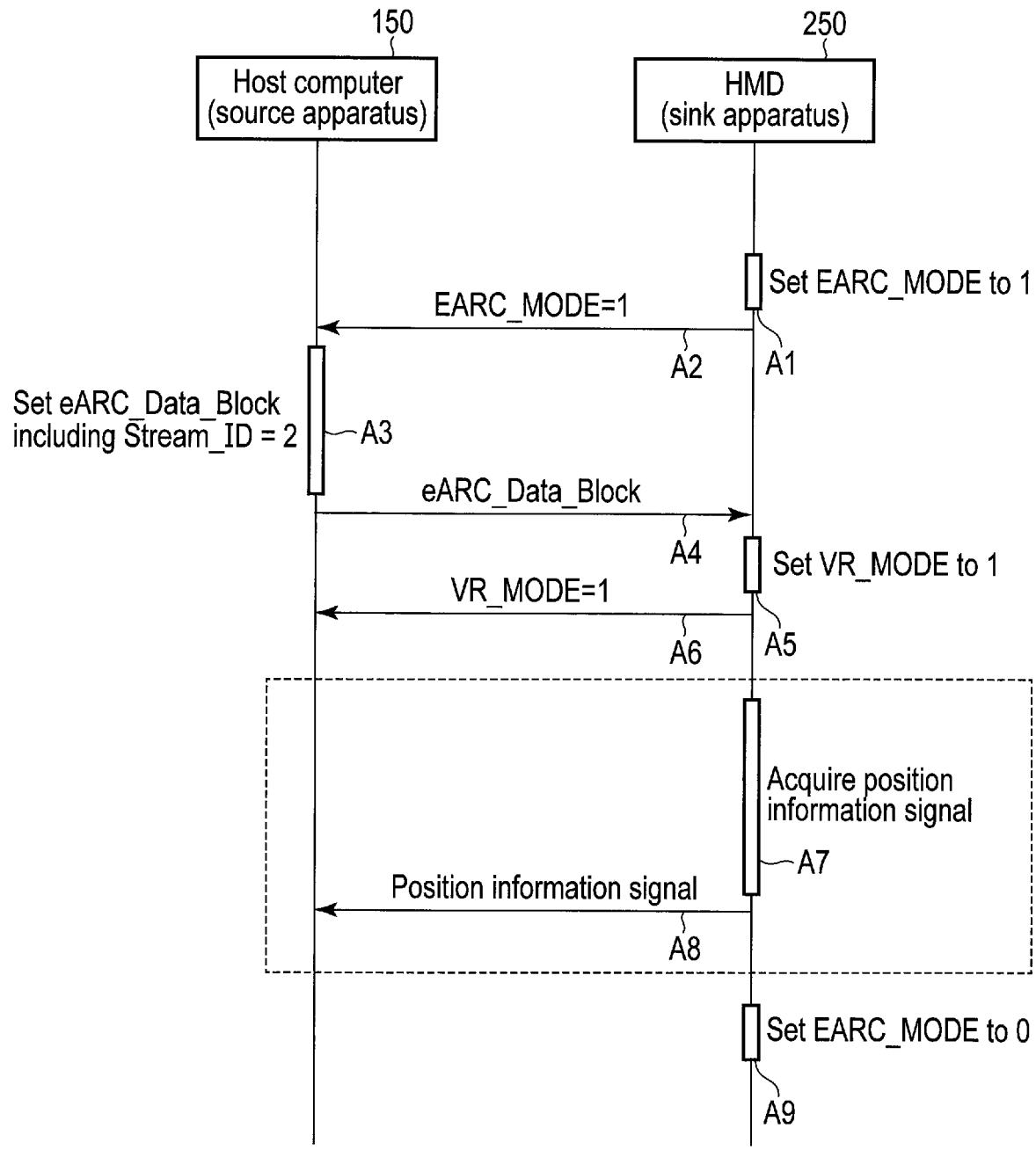
F I G. 6

ELECTRONIC APPARATUS AND CONTROL METHOD

CROSS-REFERENCE TO RELATED APPLICATIONS

This application is based upon and claims the benefit of priority from Japanese Patent Application No. 2019-082050, filed Apr. 23, 2019, the entire contents of which are incorporated herein by reference.

FIELD

Embodiments described herein relate generally to an electronic apparatus and a control method.

BACKGROUND

As a system for viewing virtual reality (VR) video, there is a VR system wherein a head-mounted display (HMD) is used. In the VR system, a VR video signal generated by a host computer is transmitted to the HMD through a video signal communication cable, and VR video based on the VR video signal is displayed on a screen of the HMD. A user thereby can view the VR video.

BRIEF DESCRIPTION OF THE DRAWINGS

FIG. 1 is a block diagram illustrating a configuration of a control system that includes electronic apparatuses according to a comparative example.

FIG. 3 is a diagram illustrating a configuration example of a status register used by the control system of FIG. 2.

FIG. 4 is a diagram illustrating a configuration example of a data block used by the control system of FIG. 2.

FIG. 5 is a diagram illustrating a configuration example of a signal list used by the control system of FIG. 2.

FIG. 6 is a diagram illustrating an example of a control sequence for transferring a position information signal performed by the control system of FIG. 2.

DETAILED DESCRIPTION

Figure 2:
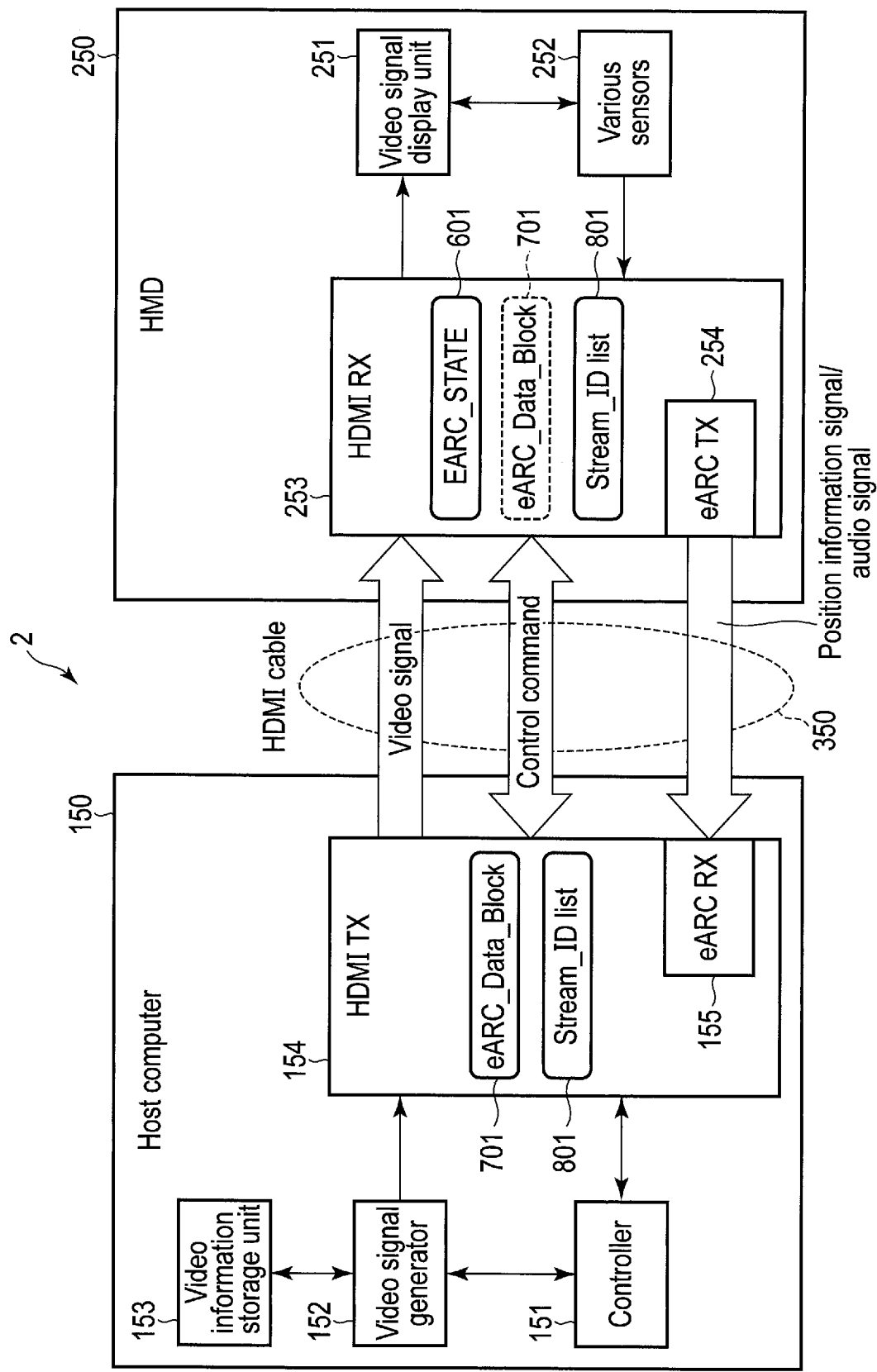
FIG. 2 is a block diagram illustrating a configuration of a control system that includes electronic apparatuses according to an embodiment.

In general, according to one embodiment, an electronic apparatus includes a receiver and a transmitter. The receiver receives a video signal from an external electronic apparatus through a cable conforming to a High-Definition Multimedia Interface (HDMI) standard. The receiver receives, from the external electronic apparatus through the cable, information for transferring a signal using a function of Audio Return Channel (ARC) or enhanced Audio Return Channel (eARC) of the HDMI standard. The transmitter transmits a position information signal or an audio signal to the external electronic apparatus through the cable, in accordance with the received information.

Embodiments will be described hereinafter with reference to the accompanying drawings.

First, in order to make a present embodiment easily understood, a configuration of a control system 1 that includes electronic apparatuses according to a comparative example will be described with reference to FIG. 1. The control system 1 is a virtual reality (VR) system for presenting VR video to a user. The control system 1 includes two electronic apparatuses, and a video signal communication cable 301 and a position information signal communication cable 302 that connect the electronic apparatuses. A case where the two electronic apparatuses are a host computer 100 and a head-mounted display (HMD) 200 will be herein described as an example.

The host computer 100 transmits a video signal to the HMD 200 through the video signal communication cable 301. The HMD 200 displays VR video based on the video signal on its screen. The screen of the HMD 200 is located in front of the eyes of the user wearing the HMD 200 on the head. Thus, the user can visually recognize the VR video displayed on the screen of the HMD 200.

The control system 1 has a tracking function of changing VR video to be displayed in accordance with a change in position and posture information of the user, such as a movement and a direction of the user's head and a position of the user. In the following description, a signal including at least one of the position and the posture of the user will be also referred to as a position information signal. The position information signal is transmitted from the HMD 200 to the host computer 100 through the position information signal communication cable 302, which differs from the video signal communication cable 301. The host computer 100 generates a video signal of VR video (hereinafter, also simply referred to as a video signal) using the received position information signal of the user, and transmits the video signal to the HMD 200 through the video signal communication cable 301. VR video according to the current position or posture of the user is thereby displayed on the screen of the HMD 200, and thus, the user can acquire a sense of immersion in the video the user is viewing.

To realize the tracking function, the transfer of a VR video signal and the transfer of a position information signal need to be performed in parallel. Thus, in the control system 1 of the comparative example, the host computer 100 and the HMD 200 are connected by the two cables of the video signal communication cable 301 and the position information signal communication cable 302. It is herein assumed that the video signal communication cable 301 is a High-Definition Multimedia Interface (HDMI) cable 301 conforming to the HDMI standard and the position information signal communication cable 302 is a USB cable 302 conforming to the USB standard.

HDMI is one of the interfaces for transferring video and audio in the form of digital signals between electronic apparatuses. Between electronic apparatuses conforming to HDMI (for example, HDMI 2.1), large-volume video signals of 4K, 8K, etc., can be transferred at a high speed through an HDMI cable. The host computer 100 and the HMD 200 may establish an HDMI connection for transferring a video signal through the HDMI cable 301, and may establish a USB connection for transferring a position information signal through the USB cable 302.

The host computer 100 transmits a video signal to the HMD 200 through the HDMI cable 301. That is, the host computer 100 is a source apparatus in an HDMI connection, and the HMD 200 is a sink apparatus in the HDMI connection.

In addition, the HMD 200 transmits a position information signal to the host computer 100 through the USB cable 302. While a video signal is transferred from the host computer 100 to the HMD 200, a position information signal is transferred from the HMD 200 to the host computer 100. In this manner, the direction in which a video signal is transferred and the direction in which a position information signal is transferred are opposite directions.

The host computer 100 includes a controller 101, a video signal generator 102, a video information storage unit 103, an HDMI transmitter (HDMI TX) 104, and a USB receiver (USB RX) 105. The controller 101 controls each unit in the host computer 100. The controller 101 requests the video signal generator 102 to generate a video signal. The controller 101 may receive a position information signal through the USB RX 105 and request the video signal generator 102 to generate a video signal according to the position information signal.

The USB RX 105 controls the connection with the HMD 200 through the USB cable 302. The USB RX 105 controls, for example, the reception of a position information signal from the HMD 200 through the USB cable 302.

The video signal generator 102 generates a video signal in response to a request from the controller 101. The video signal generator 102, for example, reads a video signal of VR video content from the video information storage unit 103 and transmits the read video signal to the HMD 200 through the HDMI TX 104 and the HDMI cable 301.

The video information storage unit 103 may store data of one or more VR video contents. Data of each VR video content may include a video signal to be transmitted as it is to the HMD 200, or may be data from which a video signal to be transmitted to the HMD 200 is obtained through a specific process performed by the video signal generator 102.

The HDMI TX 104 controls the connection with the HMD 200 through the HDMI cable 301. The HDMI TX 104 controls, for example, the transmission of a video signal to the HMD 200 through the HDMI cable 301.

In addition, the HMD 200 includes a video signal display unit 201, various sensors 202, an HDMI receiver (HDMI RX) 203, and a USB transmitter (USB TX) 204.

The video signal display unit 201 executes control so that video based on a video signal, which is received from the host computer 100 through the HDMI cable 301 and the HDMI RX 203, will be displayed on its screen. The video signal display unit 201, for example, includes two screens (displays) located in front of both eyes of the user wearing the HMD 200, respectively.

The HDMI RX 203 controls the connection with the host computer 100 through the HDMI cable 301. The HDMI RX 203 controls, for example, the reception of a video signal from the host computer 100 through the HDMI cable 301.

The various sensors 202 generate information (data) indicating the position, the posture, or the combination thereof of at least a part (for example, the head) of the user wearing the HMD 200. The various sensors 202 transmit a position information signal including the generated information to the host computer 100 through the USB TX 204 and the USB cable 302.

The USB TX 204 controls the connection with the host computer 100 through the USB cable 302. The USB TX 204 controls, for example, the transmission of a position information signal to the host computer 100 through the USB cable 302.

By virtue of the above configuration, the control system 1 can display VR video according to a change in position/posture information of the user. However, in the control system 1, the HDMI cable 301 for video signal transfer and the USB cable 302 for position information transfer are necessary. Thus, the cost of building the VR system is high, and whenever the VR system is to be used, the two cables 301 and 302 must be connected to the host computer 100 and the HMD 200, which is troublesome. Moreover, using the two cables 301 and 302 for connection increases the possibility that the cables 301 and 302 will contact the body of the user using the VR system and inhibit the user's movement.

In order to reduce the number of cables used for connection, for example, a position information signal, which is transferred through the USB cable 302, may be transferred through the HDMI cable 301. As described above, the direction from the host computer 100 to the HMD 200, in which a video signal is transferred, and the direction from the HMD 200 to the host computer 100, in which a position information signal is transferred, are opposite directions.

In order to transfer a position information signal through the HDMI cable 301, any one of Consumer Electronics Control (CEC), HDMI Ethernet (registered trademark) Channel (HEC), Audio Return Channel (ARC) defined by HDMI 1.4b, and enhanced Audio Return Channel (eARC) defined by HDMI 2.1, which can transfer a signal in the opposite direction (i.e., the direction from the HMD 200 to the host computer 100), of HDMI may be used.

CEC is a narrowband (i.e., low-speed) control channel for transferring a control command, and does not satisfy a band necessary to transfer a position information signal.

HEC has a communication band of 100 Mbps, but LSIs conforming to HEC have not been prevalent. Thus, in order to use HEC, an LSI conforming to HEC needs to be used, which increases the cost.

In addition, eARC has a communication band of 37 Mbps, but is a channel used to transfer an audio signal and does not have any configuration for transferring a position information signal for VR. As in the case of eARC, ARC is also a channel used to transfer an audio signal and does not have any configuration for transferring a position information signal for VR.

Accordingly, in the present embodiment, eARC or ARC is extended and two electronic apparatuses connected through an HDMI cable are thereby configured to transfer a position information signal. These electronic apparatuses transfer not only a video signal but also a position information signal through the HDMI cable. The user thereby can easily view VR video.

Since a communication channel defined by eARC or ARC (for example, physical layer and protocol layer) is used to transfer a position information signal, great changes or addition of software and hardware to each of the electronic apparatuses can be reduced. Each of the electronic apparatuses is provided with a component for switching between the transfer of an audio signal and the transfer of a position information signal in order to maintain the compatibility with eARC or ARC.

FIG. 2 illustrates a configuration of a control system 2 including electronic apparatuses according to the present embodiment. The control system 2 is a VR system for presenting VR video to a user as in the case of the control system 1 of the comparative example described above with reference to FIG. 1, and includes the two electronic apparatus of a host computer 150 and an HMD 250.

In addition, while the control system 1 of the comparative example includes the video signal communication cable 301 and the position information signal communication cable 302, the control system 2 of the present embodiment includes one communication cable 350. In the following description, a case where the host computer 150, the HMD 250, and the communication cable 350 conform to the HDMI standard including eARC, which is extended to enable also a position information signal to be transmitted, will be described as an example. However, the host computer 150, the HMD 250, and the communication cable 350 may conform to the HDMI standard including ARC, which is similarly extended.

The host computer 150 transmits a video signal to the HMD 250 through the communication cable 350. The HMD 250 displays VR video based on the video signal on its screen. The screen of the HMD 250 is located in front of the eyes of the user wearing the HMD 250 on the head. Thus, the user can visually recognize the VR video displayed on the screen of the HMD 250.

The control system 2 has the above-described tracking function. The HMD 250 transmits a position information signal including at least one of the position and the posture of the user using the HMD 250 to the host computer 150 through the communication cable 350. The host computer 150 generates a video signal of VR video using the received position information signal of the user, and transmits the video signal to the HMD 250 through the communication cable 350. VR video according to the current position and/or posture of the user is thereby displayed on the screen of the HMD 250.

In this manner, the host computer 150 and the HMD 250 are connected by the communication cable 350. It is herein assumed that the communication cable 350 is an HDMI cable 350 conforming to the HDMI 2.1 standard. The host computer 150 and the HMD 250 may establish an HDMI connection for transferring a video signal and a position information signal through the HDMI cable 350. The host computer 150 is a source apparatus in the HDMI connection, and the HMD 250 is a sink apparatus in the HDMI connection.

The host computer 150 transmits a video signal to the HMD 250 through the HDMI cable 350. In addition, the HMD 250 transmits a position information signal to the host computer 150 through the HDMI cable 350. While a video signal is transferred from the host computer 150 to the HMD 250, a position information signal is transferred from the HMD 250 to the host computer 150. In this manner, the direction in which a video signal is transferred and the direction in which a position information signal is transferred are opposite directions.

The host computer 150 includes a controller 151, a video signal generator 152, a video information storage unit 153, and an HDMI transmitter (HDMI TX) 154. In addition, the HDMI TX 154 includes an eARC receiver (eARC RX) 155.

The controller 151 is configured to control each unit in the host computer 150. The controller 151 is realized as, for example, at least one processor such as a CPU. The controller 151 requests the video signal generator 152 to generate a video signal. The controller 151 may receive a position information signal from the HMD 250 through the eARC RX 155 and request the video signal generator 152 to generate (for example, redraw) a video signal according to the position information signal.

The video signal generator 152 is configured to generate a video signal in response to a request from the controller 151. The video signal generator 152 is realized as, for example, a GPU. The video signal generator 152, for example, reads a video signal of a VR video content from the video information storage unit 153 and transmits the read video signal to the HMD 250 through the HDMI TX 154 and the HDMI cable 350.

Moreover, the video signal generator 152 may also generate a video signal according to a position information signal. To generate a video signal according to a position information signal, the video signal generator 152 reads a video signal corresponding to the position information signal from the video information storage unit 153 or performs a process according to the position information signal on a video signal that is read from the video information storage unit 153. When a position information signal is received from the HMD 250 through the eARC RX 155, the video signal generator 152 transmits a video signal according to the position information signal to the HMD 250 through the HDMI TX 154 and the HDMI cable 350.

The video information storage unit 153 is a storage (for example, HDD or SSD) in which data of one or more VR video contents may be stored. Data of each VR video content may include a video signal to be transmitted as it is to the HMD 250, or may be data from which a video signal to be transmitted to the HMD 250 is obtained through a specific process performed by the video signal generator 152.

The HDMI TX 154 is configured to transmit a video signal to the HMD 250 through the HDMI cable 350, for example, in accordance with the Transition-Minimized Differential Signaling (TMDS)-based protocol for transferring a video signal and an audio signal.

Moreover, the controller 151 and the HDMI TX 154 control the transmission and reception of a control command through a control channel based on CEC, etc. Each operation of the host computer 150 and the HMD 250 is controlled in accordance with the transmission and reception of a control command. The HDMI TX 154 may be further provided with a controller, a transmitter, a receiver, etc., for controlling the transmission and reception of a control command. For example, when the eARC (or ARC) function is enabled, the controller 151 and the HDMI TX 154 transmit, to the HMD 250 through the HDMI cable 350, format information for transferring a signal using the eARC function. The format information indicates either the transfer of a position information signal or the transfer of an audio signal. The details of the format information will be described later with reference to FIG. 4 and FIG. 5.

The eARC RX 155 is configured to receive, through the HDMI cable 350, either a position information signal or an audio signal, which is transmitted by the HMD 250 in accordance with the transmitted format information. The HMD 250 may be set to a state (or set in a mode) based on the format information. The eARC RX 155 receives a position information signal when a format indicative of the transfer of a position information signal is transmitted, and receives an audio signal when a format indicative of the transfer of an audio signal is transmitted.

The HMD 250 includes a video signal display unit 251, various sensors 252, and an HDMI receiver (HDMI RX) 253. In addition, the HDMI RX 253 includes an eARC transmitter (eARC TX) 254.

The video signal display unit 251 executes control so that video based on a video signal, which is received from the host computer 150 through the HDMI cable 350 and the HDMI RX 253, will be displayed on its screen. The video signal display unit 251 includes, for example, two screens (displays) located in front of both eyes of the user wearing the HMD 250, respectively.

The various sensors 252 generate information (data) that indicates the position, the posture, or the combination thereof of at least a part (for example, the head) of the user wearing the HMD 250, for example, in real time. The various sensors 252 may include a gyroscope, a distance (i.e., depth) sensor, etc.

More specifically, the various sensors 252 may generate information on the angular velocities ω (ωx, ωy, ωz) of rotation of the HMD 250 with respect to an X-axis, a Y-axis, and a Z-axis of three-dimensional space, the coordinates (x, y, z) indicative of the position of the HMD 250 in three-dimensional space, etc. The various sensors 252 transmit a position information signal including the generated information to the host computer 150 through the eARC TX 254 and the HDMI cable 350.

The HDMI RX 253 is configured to receive a video signal from the host computer 150 through the HDMI cable 350 in accordance with, for example, the TMDS protocol. In addition, the HDMI RX 253 controls the transmission and reception of a control command through a control channel based on CEC, etc. The HDMI RX 253 may be provided with a controller a transmitter, a receiver, etc., for controlling the transmission and reception of a control command. For example, when the eARC (or ARC) function is enabled, the HDMI RX 253 receives, from the host computer 150 through the HDMI cable 350, format information for transferring a signal using the eARC function.

The eARC TX 254 is configured to transmit either a position information signal or an audio signal to the host computer 150 through the HDMI cable 350, in accordance with format information for transferring a signal using the eARC (or ARC) function. More specifically, the eARC TX 254 transmits a position information signal to the host computer 150 through the HDMI cable 350, when the format information indicates the transfer of a position information signal. In addition, the eARC TX 254 transmits an audio signal to the host computer 150 through the HDMI cable 350, when the format information indicates the transfer of an audio signal. The eARC TX 254 can switch the signal to be transmitted between a position information signal and an audio signal, for example, in accordance with the mode of the HMD 250 that is set on the basis of the format information.

Moreover, when a position information signal is transmitted by the eARC TX 254, the HDMI RX 253 receives a video signal according to the position information signal from the host computer 150 through the HDMI cable 350. The video signal display unit 251 displays video based on the video signal, and the user thereby can visually recognize VR video according to the user's position and/or posture and acquire a sense of immersion.

In order to control the above-described data transfer using the eARC function through the HDMI cable 350, the HDMI_TX 154 in the host computer 150 and the HDMI RX 253 in the HMD 250 manage the status and format of data transfer. More specifically, the HDMI_TX 154 and the HDMI_RX 253 manage an EARC_STATE 601 indicative of the status of transfer by the eARC function, an eARC_Data_Block 701 for defining the format of a signal transferred using the eARC function (for example, a data block), and a Stream_ID List 801 for distinguishing the types of signal transferred using the eARC function.

FIG. 3 illustrates a configuration example of the EARC_STATE 601. The EARC_STATE 601 indicates the status of transfer by the eARC function, and may be realized as a register in the HDMI_RX 253.

The EARC_STATE 601 is constituted of, for example, an 8-bit register of a 0th bit to a 7th bit. The 4th bit is used for setting the value of EARC_MODE that indicates the enablement or disablement of the eARC function. The enablement of the eARC function means that in the control system 2, data can be transferred using the eARC function. In contrast, the disablement of the eARC function means that in the control system 2, data cannot be transferred using the eARC function. EARC_MODE is, for example, set to one when the eARC function is enabled, and set to zero when the eARC function is disabled.

The 0th bit is used for setting the value of VR_MODE that indicates a transfer mode of the enabled eARC function. More specifically, the value of VR_MODE indicates whether the enabled eARC function is used for the transfer of a position information signal in the VR system. When the eARC function is used for the transfer of a position information signal in the VR system, a VR mode is set as the transfer mode of the eARC function. In addition, when the eARC function is used for the original transfer of an audio signal, an eARC mode is set as the transfer mode of the eARC function.

More specifically, VR_MODE is set to one, when the eARC function is used for the transfer of a position information signal (VR mode). In contrast, VR_MODE is set to zero, when the eARC function is used for the transfer of an audio signal (eARC mode).

Each of the bits other than the 4th bit and the 0th bit of the EARC_STATE 601 is set to, for example, zero. These bits may be used for setting other statuses relating to the eARC function (for example, for transferring yet another type of signal).

FIG. 4 illustrates a configuration example of the eARC_Data_Block 701 for defining format information of a signal transferred using the eARC function. The eARC_Data_Block 701 is set by, for example, the host computer 150 (source apparatus), and the host computer 150 notifies the HMD 250 (sink apparatus) of the eARC_Data_Block 701.

The eARC_Data_Block 701 has a specific size according to the size of data of a transfer unit. As illustrated in FIG. 4, the 0th byte is used for setting the value of Stream_ID that indicates the type of data to be transferred. The 1st byte is used for setting the value of Data_Length that indicates the size of data to be transferred. The 2nd byte and the subsequent bytes are used to setting the values of Data_Structure that indicate the structure of data to be transferred.

The values that may be set as Stream_ID of the 0th byte are defined by a Stream_ID List 801. FIG. 5 illustrates a configuration example of the Stream_ID List 801. The Stream_ID List 801 includes multiple records. Each of the records indicates a value that may be set as Stream_ID and the type of signal associated with the value.

In FIG. 5, a case where the integer values of 0 to 255 may be set as Stream_ID is shown as an example. For example, the integer value "0" is associated with "Audio Stream 1" that indicates a type of audio signal, and the integer value "1" is associated with "Audio Stream 2" that indicates another type of audio signal. "Audio Stream 1" and "Audio Stream 2" indicate audio signals differing in attributes such as a bit rate, monaural/stereo, and 2D/3D.

The integer value "2" is associated with "VR Stream 1" that indicates a position information signal. In addition, the integer values 3 to 255 are unused values that have not yet been associated with any specific type of signal (i.e., Reserved). Each unused integer value may be defined, such that, when yet another type of signal may be transferred using the eARC function, it is associated with the signal.

The HDMI_RX 253 of the HMD 250 may set or change the value of EARC_MODE and the value of VR_MODE in the EARC_STATE 601. In addition, the controller 151 and the HDMI TX 154 of the host computer 150 may set or change the values in the eAR_Data_Block 701.

The HDMI_RX 253 of the HMD 250 sets EARC_MODE to a value for enabling the eARC function (=1) in response to, for example, the start of reception of a video signal from the host computer 150. In addition, the HDMI_RX 253 sets EARC_MODE to a value for disabling the eARC function (=0) in response to, for example, the end of reception of a video signal from the host computer 150. Alternatively, the HDMI_RX 253 may set or change the value of EARC_MODE in accordance with a control command to enable or disable the eARC function received from the host computer 150.

In addition, the controller 151 and the HDMI TX 154 of the host computer 150 may set or change at least the value of Stream_ID in the eARC_Data_Block 701 in response to the setting of EARC_MODE in the EARC_STATE 601 to a value for enabling the eARC function (=1). The controller 151 and the HDMI TX 154 set a value, which corresponds to the type of signal to be transferred from the HMD 250 to the host computer 150 using the eARC function, as Stream_ID.

For example, when the signal to be transferred is a position information signal (VR Stream 1), the controller 151 and the HDMI TX 154 set, as Stream_ID, a value indicative of a position information signal (=2). In addition, when the signal to be transferred is an audio signal (Audio Stream 1 or Audio Stream 2), the controller 151 and the HDMI TX 154 set, as Stream_ID, a value indicative of an audio signal (=0 or 1).

The HDMI TX 154 transmits the eARC_Data_Block 701, which includes Stream_ID set as described above, to the HDMI RX 253 of the HMD 250. The eARC_Data_Block 701 thereby can be used to notify the HMD 250 of whether the signal to be transmitted using the eARC function is a position information signal or an audio signal.

More specifically, the HDMI_RX 253 sets or changes the value of VR_MODE in the EARC_STATE 601, on the basis of the value of Stream_ID in the eARC_Data_Block 701 received from the host computer 150. For example, when Stream_ID is set to a value indicative of a position information signal (VR Stream 1) (=2), the HDMI_RX 253 sets, as VR_MODE, a value indicating that the eARC function is used in the VR system (that is, used in the VR mode) (=1). In contrast, when Stream_ID is set to a value indicative of an audio signal (Audio Stream 1 or Audio Stream 2) (=0 or 1), the HDMI RX 253 sets, as VR_MODE, a value indicating that the eARC function is not used in the VR system (that is, used in the eARC mode) (=0).

When EARC_MODE is set to one and VR_MODE is set to one, that is, when the eARC function is enabled and used in the VR mode, the eARC TX 254 of the HMD 250 transmits a position information signal, and the eARC RX 155 of the host computer 150 receives the position information signal. In addition, when EARC_MODE is set to one and VR_MODE is set to zero, that is, when the eARC function is enabled and used in the eARC mode, the eARC TX 254 of the HMD 250 transmits an audio signal and the eARC RX 155 of the host computer 150 receives the audio signal.

As described above, the host computer 150 and the HMD 250 can switch the signal to be transferred using the eARC function between a position information signal and an audio signal, using the EARC_STATE 601, the eARC_Data_Block 701, and the Stream_ID List 801.

Figure 7:
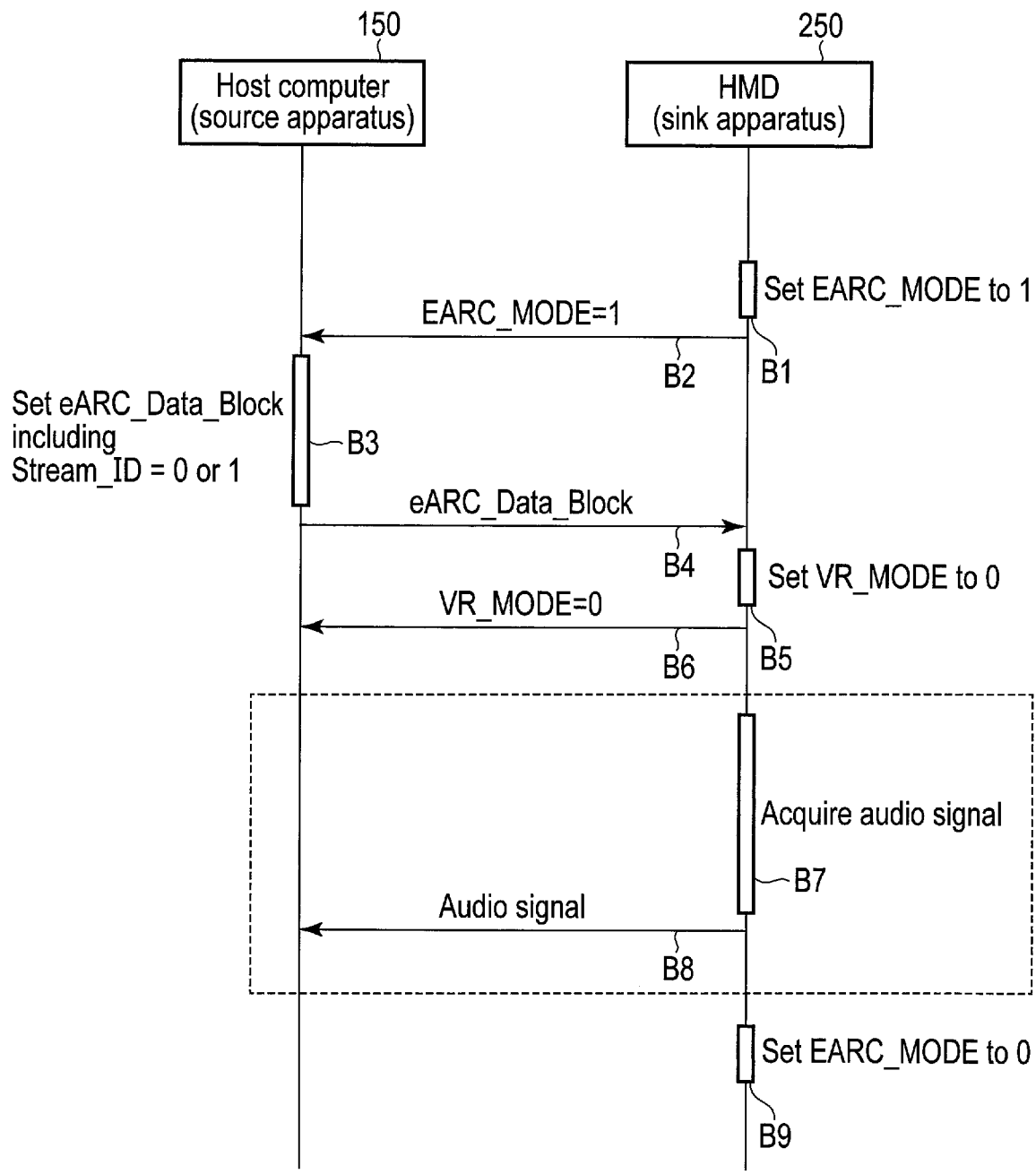
FIG. 7 is a diagram illustrating an example of a control sequence for transferring an audio signal performed by the control system of FIG. 2.

FIG. 6 and FIG. 7 illustrate an example of a control sequence for transmitting a position information signal or an audio signal from the HMD 250 to the host computer 150. As described above, the host computer 150 is an example of a source apparatus of an HDMI connection, and the HMD 250 is an example of a sink apparatus of the HDMI connection.

The control sequence for transmitting a position information signal from the HMD 250 to the host computer 150 will be described with reference to FIG. 6.

The HMD 250 first sets EARC_MODE in the EARC_STATE 601 to a value indicative of the enablement of the eARC function (=1) (A1). The HMD 250 may set EARC_MODE to one in response to, for example, a request from the host computer 150 through a control channel based on CEC. In response to the setting of EARC_MODE to one, the eARC function of the control system 2 is enabled. The HMD 250 notifies the host computer 150 through the control channel that EARC_MODE has been set to one (A2).

In response to the notification, the host computer 150 sets Stream_ID in the eARC_Data_Block 701 to a value indicating that the signal to be transferred is a position information signal (VR Stream 1) (=2) (A3). The host computer 150 may also set Data_Length and Data_Structure in the eARC_Data_Block 701 to specific values. Then, the host computer 150 transmits the eARC_Data_Block 701 to the HMD 250 through the control channel (A4).

Since Stream_ID in the eARC_Data_Block 701 has been set to a value indicative of the transfer of a position information signal (=2), the HMD 250 sets VR_MODE in the EARC_STATE 601 to a value indicating that the eARC function is used in the VR system (=1) (A5). The HMD 250 notifies the host computer 150 through the control channel that VR_MODE has been set to one (A6).

Then, the HMD 250 acquires a position information signal generated by the various sensors 252 (A7), and transmits the position information signal to the host computer 150 through the eARC TX 254 (A8). The process for acquiring and transmitting a position information signal in A7 and A8 may be repeatedly executed until, for example, the transfer of a video signal from the host computer 150 to the HMD 250 ends.

When the transfer of a position information signal ends, the HMD 250 sets EARC_MODE in the EARC_STATE 601 to a value indicative of the disablement of the eARC function (=0) (A9). The HMD 250 may set EARL MODE to zero in response to, for example, a request from the host computer 150 through a control channel based on CEC. In response to the setting of EARC_MODE to zero, the eARC function of the control system 2 is disabled.

In the above-described manner, a position information signal can be transferred through the HDMI cable 350, and thus, for example, one cable is sufficient to connect the host computer 150 and the HMD 250 constituting the VR system. That is, not only a video signal but also a position information signal can be transferred through the one HDMI cable 350. Thus, in the control system 2 of the present embodiment, the number of cables can be reduced more than in the control system 1 of the comparative example, in which the host computer 100 and the HMD 200 are connected by the two cables 301 and 302 in order to transfer a video signal and a position information signal. By virtue of the reduction, the control system 2 of the present embodiment can be realized as a VR system that is low in price and building cost and that hardly inhibits the user's movement when it is used. Accordingly, the user can view VR video easily and comfortably.

The control sequence for transmitting an audio signal from the HMD 250 to the host computer 150 will be next described with reference to FIG. 7.

In the process in B1 and B2 shown in FIG. 7, the HMD 250 sets EARC_MODE in the EARC_STATE 601 to a value indicative of the enablement of the eARC function (=1) (B1) and notifies the host computer 150 through the control channel that EARC_MODE has been set to one (B2) as in the process in A1 and A2 described above with reference to FIG. 6.

In response to the notification, the host computer 150 sets Stream_ID in the eARC_Data_Block 701 to a value indicating that the signal to be transferred is an audio signal (Audio Stream 1 or Audio Stream 2) (=0 or 1) (B3). The host computer 150 may also set Data_Length and Data_Structure in the eARC_Data_Block 701 to specific values. Then, the host computer 150 transmits the eARC_Data_Block 701 to the HMD 250 through the control channel (B4).

Since Stream_ID in the eARC_Data_Block 701 has been set to a value indicative of the transfer of an audio signal (=0 or 1), the HMD 250 sets VR_MODE in the EARC_STATE 601 to a value indicating that the eARC function is not used in the VR system (=0) (B5). The HMD 250 notifies the host computer 150 through the control channel that VR_MODE has been set to zero (B6).

Then, the HMD 250 acquires an audio signal (B7), and transmits the audio signal to the host computer 150 through the eARC TX 254 (B8). The process for acquiring and transmitting an audio signal in B7 and B8 may be repeatedly executed until, for example, the transfer of a video signal from the host computer 150 to the HMD 250 ends.

When the transfer of an audio signal ends, the HMD 250 sets EARC_MODE in the EARC_STATE 601 to a value indicative of the disablement of the eARC function (=0) (B9). The HMD 250 may set EARC_MODE to zero in response to, for example, a request from the host computer 150 through a control channel based on CEC. In response to the setting of EARC_MODE to zero, the eARC function of the control system 2 is disabled.

The control sequences of FIG. 6 and FIG. 7 can be performed by, not only the combination of the host computer 150 and the HMD 250, but also any combination of various electronic apparatuses (for example, a television signal receiver, an AV amplifier, a video recorder, a DVD player, a set-top box, a game console, and a video camera) used as a source apparatus and a sink apparatus of an HDMI connection. Between the electronic apparatuses of an combination connected by an HDMI cable, a video signal can be transferred in a first direction, and in accordance with the above-described control sequences, either a position information signal or an audio signal can be transferred using the eARC function (or ARC function) in a second direction opposite to the first direction. The position information signal may be another type of signal.

Figure 8:
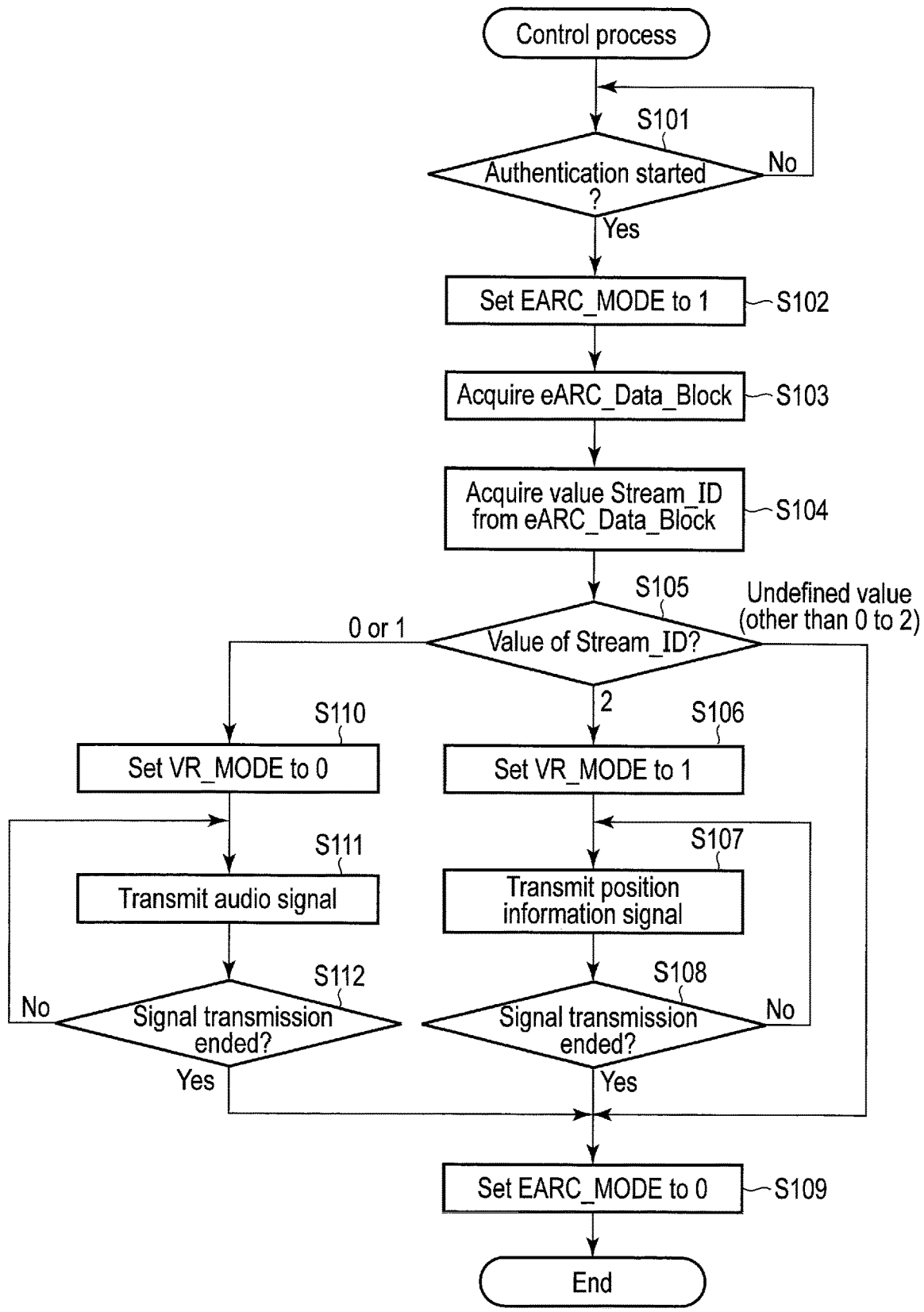
FIG. 8 is a flowchart illustrating an example of the procedure of a control process executed by the electronic apparatus (for example, an HMD) of the embodiment.

An example of the procedure of a control process executed by the HMD 250 will be described with reference to the flowchart of FIG. 8. A case where the HMD 250 conforms to HDMI 2.1 including eARC will be herein described as an example.

The HMD 250 first determines whether the authentication of the host computer 150 connected through the HDMI cable 350 is started (step S101). The HMD 250 determines that the authentication of the host computer 150 is started, for example, when the viewing of video is started or when the reception of a video signal is started. When the authentication of the host computer 150 is not started (NO in step S101), the flow returns to step S101 and it is determined again whether the authentication is started.

When the authentication of the host computer 150 is started (YES in step S101), the HMD 250 executes an authentication process for the host computer 150, and then sets EARC_MODE in the EARC_STATE 601 to a value for enabling the eARC function (=1) (step S102). In response to this, the host computer 150 and the HMD 250 transition to the state of being able to transfer data using the eARC function.

Then, the HMD 250 receives the eARC_Data_Block 701 from the host computer 150 (step S103), and acquires the value of Stream_ID in the eARC_Data_Block 701 (step S104). The eARC_Data_Block 701 is defined (set) by the host computer 150. The process branches in accordance with the acquired value of Stream_ID (step S105).

When the acquired value of Stream_ID is two ("2" in step S105), the HMD 250 sets VR_MODE in the EARC_MODE 601 to a value for transferring a position information signal (=1) (step S106). The HMD 250 transmits a position information signal to the host computer 150 through the HDMI cable 350 (step S107). Then, the HMD 250 determines whether the transmission of a position information signal is ended (step S108). The HMD 250 determines that the transmission of a position information signal is ended, for example, when the reception of a video signal ends. In contrast, the HMD 250 determines that the transmission of a position information signal is not ended, for example, when the reception of a video signal is continuing.

When the transmission of a position information signal is not ended (NO in step S108), the flow returns to step S107 and the HMD 250 continues the transmission of a position information signal. In contrast, when the transmission of a position information signal is ended (YES in step S108), the HMD 250 sets EARC_MODE to a value for disabling the eARC function (=0) (step S109) and ends the process.

In addition, when the value of Stream_ID acquired in step S104 is zero or one ("0 or 1" in step S105), the HMD 250 sets VR_MODE in the EARC_MODE 601 to a value for transferring an audio signal (=0) (step S110). The HMD 250 transmits an audio signal to the host computer 150 through the HDMI cable 350 (step S111). Then, the HMD 250 determines whether the transmission of an audio signal is ended (step S112). The HMD 250 determines that the transmission of an audio signal is ended, for example, when the reception of a video signal ends. In contrast, the HMD 250 determines that the transmission of an audio signal is not ended, for example, when the reception of a video signal is continuing.

When the transmission of an audio signal is not ended (NO in step S112), the flow returns to step S111 and the HMD 250 continues the transmission of an audio signal. In contrast, when the transmission of an audio signal is ended (YES in step S112), the HMD 250 sets EARC_MODE to a value for disabling the eARC function (=0) (step S109) and ends the process.

Moreover, when the value of Stream_ID acquired in step S104 is not zero, one, or two ("Undefined value" 5 in step S105), the HMD 250 sets EARC_MODE to a value for disabling the eARC function (=0) (step S109) and ends the process.

In the above-described manner, the HMD 250 can transmit a position information signal to the host computer 150 through the HDMI cable 350 when the host computer 150 designates the transfer of a position information signal. In contrast, when the host computer 150 designates the transfer of an audio signal, the HMD 250 can transmit an audio signal to the host computer 150 through the HDMI cable 350. The HMD 250 can acquire the eARC_Data_Block 701 defined by the host computer 150 and switch the signal to be transmitted between a position information signal and an audio signal in accordance with the value of Stream_ID in the eARC_Data_Block 701.

Figure 9:
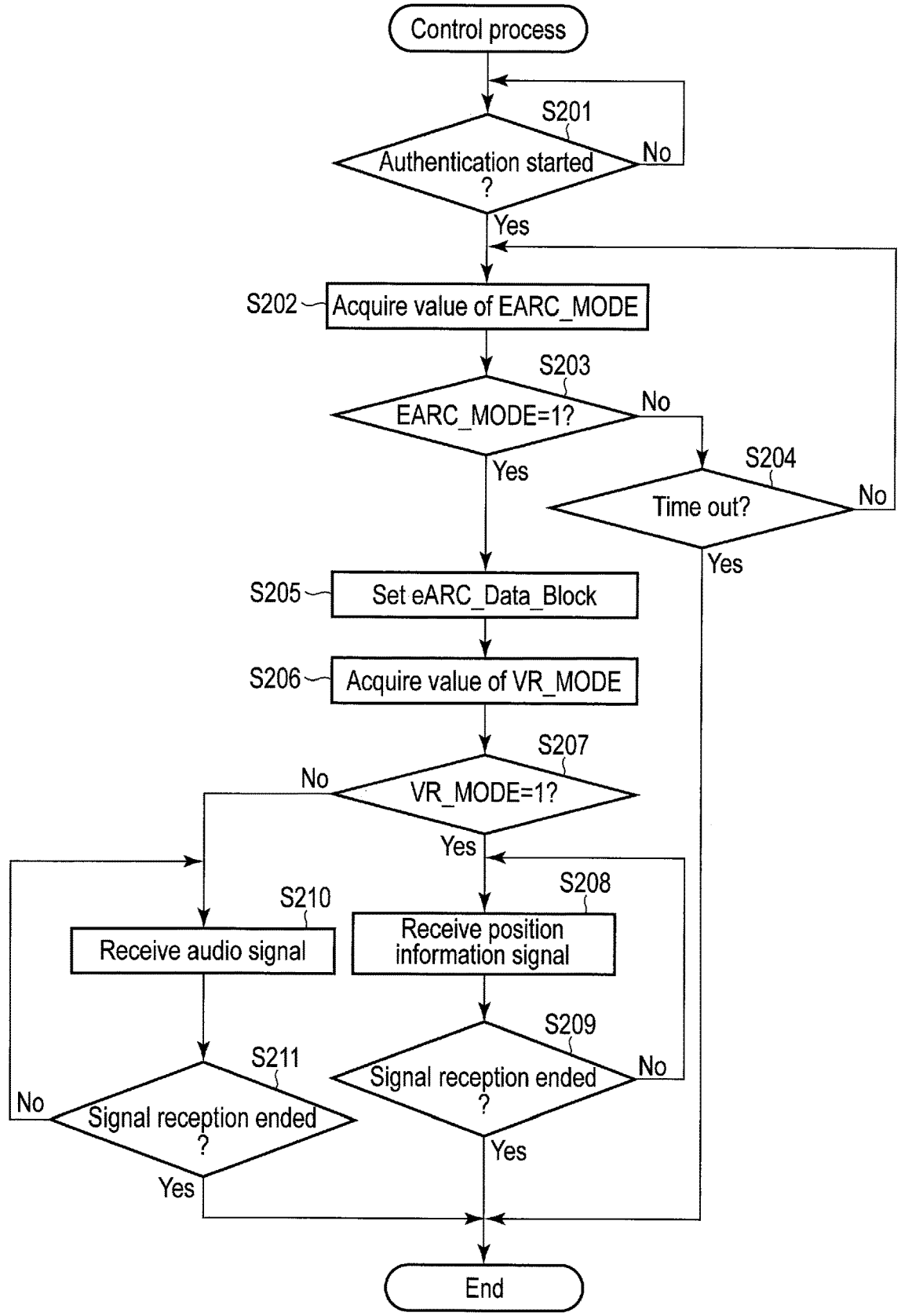
FIG. 9 is a flowchart illustrating an example of the procedure of a control process executed by the electronic apparatus (for example, a host computer) of the embodiment.

The flowchart of FIG. 9 illustrates an example of the procedure of a control process executed by the host computer 150. A case where the host computer 150 conforms to HDMI 2.1 including eARC will be herein described as an example.

The host computer 150 first determines whether the authentication of the HMD 250 connected through the HDMI cable 350 is started (step S201). The host computer 150 determines that the authentication of the HMD 250 is started, for example, when the viewing of video is started or when the transmission of a video signal is started. When the authentication of the HMD 250 is not started (NO in step S201), the flow returns to step S201 and it is determined again whether the authentication is started.

When the authentication of the HMD 250 is started (YES in step S201), the host computer 150 executes an authentication process for the HMD 250, and then acquires the value of EARC_MODE in the EARC_STATE 601 from the HMD 250 (step S202). The host computer 150 determines whether the acquired value of EARC_MODE is a value indicative of the enablement of the eARC function (=1) (step S203).

When the acquired value of EARC_MODE is not one (for example, when the acquired value of EARC_MODE is zero) (NO in step S203), the host computer 150 determines whether a time out is detected (step S204). The fact that the acquired value of EARC_MODE is not one means that the eARC function of the HMD 250 is not enabled. The host computer 150 detects a time out, when EARC_MODE, which is set to one, is not acquired even though the value of EARC_MODE has been repeatedly acquired for a specific time (for example, few seconds) since the value of EARC_MODE was acquired for the first time. When a time out is not detected (NO in step S204), the flow returns to step S202 and a process according to the newly acquired value of EARC_MODE is executed. When a time out is detected (YES in step S204), the process ends.

In addition, when the acquired value of EARC_MODE is one (YES in step S203), the host computer 150 defines (sets) the eARC_Data_Block 701 (step S205). More specifically, the host computer 150 sets Stream_ID in the eARC_Data_Block 701 to two, when a position information signal should be received from the HMD 250. In contrast, when an audio signal should be received from the HMD 250, the host computer 150 sets Stream_ID in the eARC_Data_Block 701 to zero or one. Stream_ID may be set to another value corresponding to the type of a signal that should be received from the HMD 250.

Then, the host computer 150 acquires the value of VR_MODE from the HMD 250 (step S206), and determines whether the value of VR_MODE is a value indicative of the transfer of a position information signal (=1) (step S207).

When the value of VR_MODE is one (YES in step S207), the host computer 150 receives a position information signal from the HMD 250 (more specifically, the eARC TX 254) (step S208). The position information signal is used for, for example, generating a video signal according to the position and/or posture of the user using the HMD 250. Then, the host computer 150 determines whether the reception of a position information signal is ended (step S209). The host computer 150 determines that the reception of a position information signal is ended, for example, when the transmission of a video signal ends. In contrast, the host computer 150 determines that the reception of a position information signal is not ended, for example, when the transmission of a video signal is continuing.

When the reception of a position information signal is not ended (NO in step S209), the flow returns to step S208 and the host computer 150 continues the reception of a position information signal. In contrast, when the reception of a position information signal is ended (YES in step S209), the host computer 150 ends the process.

In addition, when the value of VR_MODE is not one (NO in step S207), that is, when the value of VR_MODE is a value indicative of the transfer of an audio signal (=0), the host computer 150 receives an audio signal from the HMD 250 (more specifically, the eARC TX 254) (step S210). Then, the host computer 150 determines whether the reception of an audio signal is ended (step S211). The host computer 150 determines that the reception of an audio signal is ended, for example, when the transmission of a video signal ends. In contrast, the host computer 150 determines that the reception of an audio signal is not ended, for example, when the transmission of a video signal is continuing.

When the reception of an audio signal is not ended (NO in step S211), the flow returns to step S210 and the host computer 150 continues the reception of an audio signal. In contrast, when the reception of an audio signal is ended (YES in step S211), the host computer 150 ends the process.

In the above-described manner, the host computer 150 can receive a position information signal from the HMD 250 through the HDMI cable 350 when the transfer (reception) of a position information signal is designated. In contrast, when the transfer of an audio signal is designated, the host computer 150 can receive an audio signal from the HMD 250 through the HDMI cable 350. The host computer 150 can define (set) the eARC_Data_Block 701 and switch the signal to be received between a position information signal and an audio signal in accordance with the value of Stream_ID in the eARC_Data_Block 701.

As described above, according to the present embodiment, the user can easily view VR video. The HDMI RX 253 of the HMD 250 is configured to receive a video signal from an external electronic apparatus (for example, the host computer 150) through the HDMI cable 350, and receive, from the external electronic apparatus through the HDMI cable 350, information for transferring a signal using the ARC or eARC function of the HDMI standard (for example, the eARC_Data_Block 701). The eARC TX 254 is configured to transmit either a position information signal or an audio signal to the external electronic apparatus through the HDMI cable 350, in accordance with the received information.

In addition, the HDMI TX 154 of the host computer 150 is configured to transmit a video signal to an external electronic apparatus (for example, the HMD 250) through the HDMI cable 350, and transmit, to the external electronic apparatus through the HDMI cable 350, information for transferring wither a position information signal or an audio signal using the ARC or eARC function of the HDMI standard (for example, the eARC_Data_Block 701). The eARC RX 155 is configured to receive, through the HDMI cable 350, either a position information signal or an audio signal that is transmitted by the external electronic apparatus in accordance with the information.

In the above-described manner, a position information signal can be transferred using the ARC or eARC function. That is, not only a video signal but also a position information signal can be transferred through the HDMI cable 350. Thus, for example, the control system 2 constituted of the host computer 150 and the HMD 250 can be realized as a VR system which is low in price and building cost and which hardly inhibits the user's movement when it is used. Accordingly, the user can view VR video easily and comfortably.

Each of various functions disclosed in the present embodiment may be realized by a circuit (processing circuit). Examples of the processing circuit include a programmed processor such as a central processing unit (CPU). This processor performs each described function by executing a computer program (instructions) stored in a memory. This processor may be a microprocessor including an electronic circuit. Examples of the processing circuit also include a digital signal processor (DSP), an application-specific integrated circuit (ASIC), a microcontroller, a controller, and other electronic circuit components. Components other than the CPU disclosed in the present embodiment may also be each implemented by the processing circuit.

Since various processes of the present embodiment may be realized by a computer program, the same advantages as those of the present embodiment can easily be obtained simply by installing the computer program in a computer through a computer-readable storage medium in which the computer program is stored and by executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a receiver configured to:
      receive a video signal from an external electronic apparatus through a cable conforming to a High-Definition Multimedia Interface (HDMI) standard; and
      receive, from the external electronic apparatus through the cable, information indicative of a type of a signal to be transferred using a function of Audio Return Channel (ARC) or enhanced Audio Return Channel (eARC) of the HDMI standard; and
   a transmitter configured to:
      transmit a signal, which is switched between a position information signal and an audio signal in accordance with the received information, to the external electronic apparatus through the cable using the function;
      when the received information indicates transfer of the position information signal, set a first mode as a transfer mode in which the function is used, and transmit the position information signal to the external electronic apparatus through the cable using the function; and
      when the received information indicates transfer of the audio signal, set a second mode as the transfer mode in which the function is used, and transmit the audio signal to the external electronic apparatus through the cable using the function.

2. The electronic apparatus of claim 1, wherein the receiver is configured to receive the information, when the function is enabled.

3. The electronic apparatus of claim 1, wherein the transmitter is configured to:
   when the received information indicates transfer of the position information signal, transmit the position information signal to the external electronic apparatus through the cable using the function; and
   when the received information indicates transfer of the audio signal, transmit the audio signal to the external electronic apparatus through the cable using the function.

4. The electronic apparatus of claim 1, wherein the position information signal comprises at least one of position information or posture information of a user who uses the electronic apparatus.

5. The electronic apparatus of claim 1, wherein the receiver is further configured to receive, when the transmitter transmits a first position information signal, a video signal corresponding to the first position information signal from the external electronic apparatus through the cable.

6. An electronic apparatus comprising:
   a transmitter configured to:
      transmit a video signal to an external electronic apparatus through a cable conforming to a High-Definition Multimedia Interface (HDMI) standard; and
      transmit, to the external electronic apparatus through the cable, information indicative of a type of a signal to be transferred using a function of Audio Return Channel (ARC) or enhanced Audio Return Channel (eARC) of the HDMI standard; and
   a receiver configured to:
      receive a signal, which is switched between a position information signal and an audio signal in accordance with the information, from the external electronic apparatus through the cable using the function;
      when the information indicative of transfer of the position information signal is transmitted and a first mode is set as a transfer mode in which the function of the external electronic apparatus is used, receive the position information signal from the external electronic apparatus through the cable using the function; and
      when the information indicative of transfer of the audio signal is transmitted and a second mode is set as the transfer mode in which the function of the external electronic apparatus is used, receive the audio signal from the external electronic apparatus through the cable using the function.

7. The electronic apparatus of claim 6, wherein the transmitter is configured to transmit the information when the function is enabled.

8. The electronic apparatus of claim 6, wherein
   the transmitter is configured to transmit the information indicative of transfer of the position information signal or the audio signal, and
   the receiver is configured to:
      when the information indicative of transfer of the position information signal is transmitted, receive the position information signal from the external electronic apparatus through the cable using the function; and when the information indicative of transfer of the audio signal is transmitted, receive the audio signal from the external electronic apparatus through the cable using the function.

9. The electronic apparatus of claim 6, wherein the position information signal comprises at least one of position information or posture information of a user who uses the external electronic apparatus.

10. The electronic apparatus of claim 6, wherein the transmitter is further configured to, when the receiver receives a first position information signal, transmit a video signal corresponding to the first position information signal to the external electronic apparatus through the cable.

11. A control method of controlling an electronic apparatus that receives a video signal from an external electronic apparatus through a cable conforming to a High-Definition Multimedia Interface (HDMI) standard, the control method comprising:

receiving, from the external electronic apparatus through the cable, information indicative of a type of a signal to be transferred using a function of Audio Return Channel (ARC) or enhanced Audio Return Channel (eARC) function of the HDMI standard; and transmitting a signal, which is switched between a position information signal and an audio signal in accordance with the received information, to the external electronic apparatus through the cable using the function, wherein the transmitting includes:

when the received information indicates transfer of the position information signal, setting a first mode as a transfer mode in which the function is used, and transmitting the position information signal to the external electronic apparatus through the cable using the function; and when the received information indicates transfer of the audio signal, setting a second mode as the transfer mode in which the function is used, and transmitting the audio signal to the external electronic apparatus through the cable using the function.

12. A control method of controlling an electronic apparatus that transmits a video signal to an external electronic apparatus through a cable conforming to a High-Definition Multimedia Interface (HDMI) standard, the control method comprising:

transmitting, to the external electronic apparatus through the cable, information indicative of a type of a signal to be transferred using a function of Audio Return Channel (ARC) or enhanced Audio Return Channel (eARC) of the HDMI standard; and receiving a signal, which is switched between a position information signal and an audio signal in accordance with the information, from the external electronic apparatus through the cable using the function, wherein the receiving includes:

when the information indicative of transfer of the position information signal is transmitted and a first mode is set as a transfer mode in which the function of the external electronic apparatus is used, receiving the position information signal from the external electronic apparatus through the cable using the function; and when the information indicative of transfer of the audio signal is transmitted and a second mode is set as the transfer mode in which the function of the external electronic apparatus is used, receiving the audio signal from the external electronic apparatus through the cable using the function.

* * * * *